(12) United States Patent
Milburn

(10) Patent No.: US 6,870,120 B2
(45) Date of Patent: Mar. 22, 2005

(54) WELDING TORCH

(75) Inventor: Richard G Milburn, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/684,443

(22) Filed: Oct. 15, 2003

(65) Prior Publication Data

US 2004/0084420 A1 May 6, 2004

(30) Foreign Application Priority Data

Oct. 30, 2002 (GB) .............................................. 0225201

(51) Int. Cl.$^7$ .............................................. B23K 9/167
(52) U.S. Cl. ........................................ 219/75; 219/136
(58) Field of Search ........................... 219/74, 75, 136, 219/137 R

(56) References Cited

U.S. PATENT DOCUMENTS 2,950,378 A * 8/1960 Tuthill .......................... 219/74
5,319,179 A * 6/1994 Joecks et al. ........... 219/137 R
5,950,904 A 9/1999 Camy

FOREIGN PATENT DOCUMENTS

GB 1532182 P 11/1978
GB 2308562 P 7/1997

\* cited by examiner

*Primary Examiner*—Clifford C. Shaw
(74) *Attorney, Agent, or Firm*—W. Warren Taltavull; Manelli Denison & Selter PLLC

(57) ABSTRACT

A welding torch (10) comprises an electrode (12), means to supply weld filler material (14), a nozzle (16) surrounding the electrode (12), means to supply inert gas (17) to the nozzle (16) and a shroud (18) surrounding the nozzle (16). There are means to form a seal (20) provided between the nozzle (16) and the shroud (18), the means to form a seal (20) is arranged to allow relative movement between the nozzle (16) and the shroud (18). The means to form a seal (20) comprises a plurality of rings (22,24,26). Each ring (22,24,26) has an aperture (28,30,32) and an outer diameter (34,36,38). The diameter of the aperture (28) in a first ring (22) is substantially the same as the diameter of the nozzle (16). The outer diameter (34) of the first ring (22) is less than the outer diameter (36) of a second ring (24). The outer diameter (36) of the second ring (24) is substantially the same as the diameter of the shroud (18). The diameter of the aperture (30) in the second ring (24) is greater than the diameter of the aperture (28) in the first ring (22). The rings (22,24,26) are slidably mounted to allow relative radial movement between the nozzle (16) and the shroud (18).

18 Claims, 1 Drawing Sheet

WELDING TORCH

The present invention relates to a welding torch, for joining metal, or alloy, components together or for repairing metal, or alloy, components by build up welding. The present invention relates in particular to a welding torch for carrying out a method known as free shape welding for building up metal, or alloy, components from weld material.

Free shape welding is described in U.S. Pat. No. 5,233,150 and International patent application no WO9015375A.

During these welding processes it is often necessary to protect the metal, or alloy, from oxidation. In particular titanium alloys may suffer from oxidation. In these circumstances it is known to locate the welding torch, associated equipment and components in a sealed chamber and the sealed chamber is supplied with an inert gas, for example argon, helium, neon, krypton or a gas which is inert with respect to the metal or alloy, for example nitrogen, as is described in our UK patent application GB2373749A.

However, it is expensive to provide a sealed chamber to enclose the welding torch, associated equipment and components.

Accordingly the present invention seeks to provide a novel welding torch, which reduces, preferably overcomes, the above-mentioned problems.

Accordingly the present invention provides a welding torch comprising an electrode, means to supply weld filler material, a nozzle surrounding the electrode, means to supply inert gas to the nozzle and a shroud surrounding the nozzle, means to form a seal between the nozzle and the shroud, the means to form a seal being arranged to allow relative movement between the nozzle and the shroud.

Preferably the means to form a seal comprises a plurality of members, each member having an aperture and a periphery, the dimensions of the aperture in a first member being substantially the same as the dimensions of the nozzle, the dimensions of the periphery of the first member being less than the dimensions of the periphery of a second member, the dimensions of the periphery of the second member being substantially the same as the dimensions of the shroud, the dimensions of the aperture in the second member being greater than the dimensions of the aperture in the first member, the members being slidably mounted to allow relative movement between the nozzle and the shroud.

Preferably there are three members, the dimensions of the periphery of the third member is less than the dimensions of the periphery of the second member and greater than the dimensions of the periphery of the first member, the dimensions of the aperture in the third member is greater than the dimensions of the aperture in the first member and less than the dimensions of the aperture in the second member.

Preferably the nozzle and the shroud are circular in cross-section.

Preferably the nozzle and shroud are cylindrical.

Preferably the means to form a seal allows relative radial movement between the nozzle and the shroud.

Preferably the means to form a seal allows relative axial movement between the nozzle and the shroud.

Preferably the means to form a seal comprises a plurality of rings, each ring having an aperture and an outer diameter, the diameter of the aperture in a first ring being substantially the same as the diameter of the nozzle, the outer diameter of the first ring being less than the outer diameter of a second ring, the outer diameter of the second ring being substantially the same as the diameter of the shroud, the diameter of the aperture in the second ring being greater than the diameter of the aperture in the first ring, the rings being slidably mounted to allow relative radial movement between the nozzle and the shroud.

Preferably there are three rings, the outer diameter of the third ring is less than the outer diameter of the second ring and greater than the outer diameter of the first ring, the diameter of the aperture in the third ring is greater than the diameter of the aperture in the first ring and less than the diameter of the aperture in the second ring.

Preferably the first ring has an annular sleeve and the annular sleeve locates on the nozzle.

Preferably the second ring is supported by the first ring.

Preferably the second ring is supported by the third ring and the third ring is supported by the first ring.

Preferably the outer diameter of the second ring is movable to allow relative axial movement between the nozzle and the shroud.

The nozzle and the shroud may be rectangular in cross-section. The nozzle and the shroud may be square in cross-section.

Alternatively the members may be rectangular in shape.

Additionally the members may be triangular, pentagonal, hexagonal, heptagonal or octagonal in shape.

A sealing member may be provided around the shroud to form a seal, in operation, with at least one workpiece. The sealing member may be weighted to form a seal, in operation, with a curved surface of the at least one workpiece.

The present invention will be more fully described by way of example with reference to the accompanying drawings in which.

Figure 1:
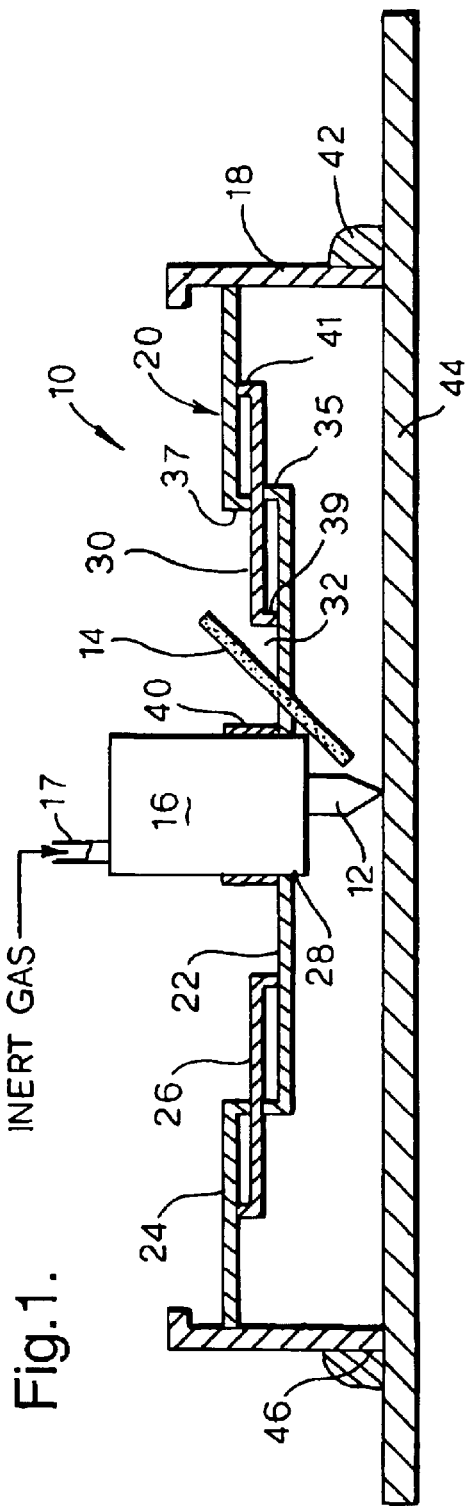
FIG. 1 shows a welding torch according to the present invention in a first position.
Figure 2:
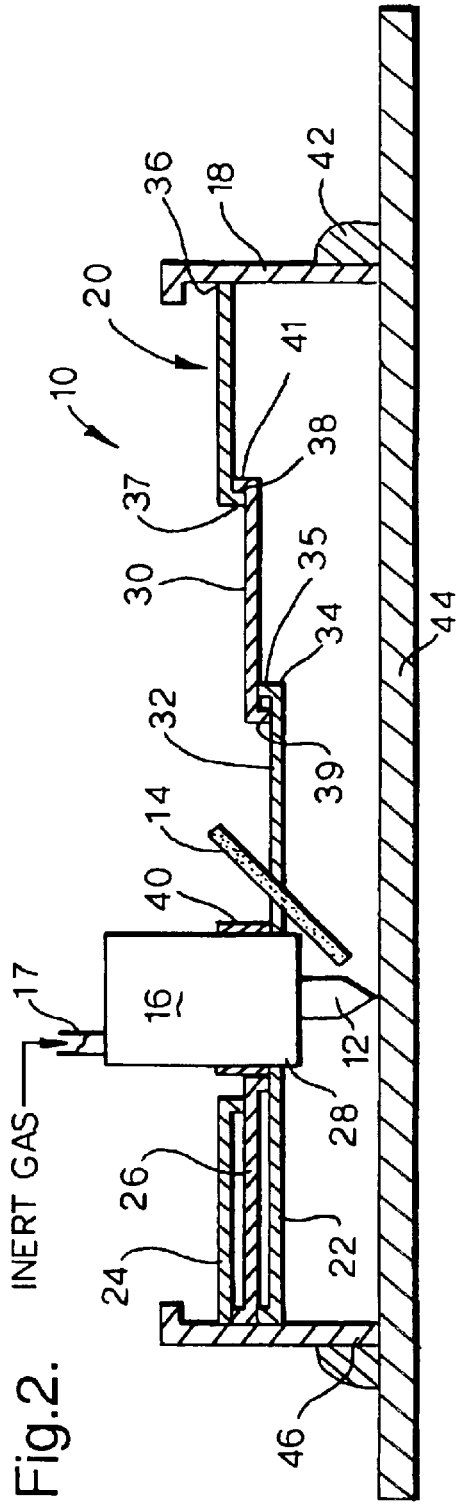
FIG. 2 shows a welding torch according to the present invention in a second position.

A welding torch 10 according to the present invention is shown in FIGS. 1 and 2. The welding torch 10 is a tungsten inert gas (TIG) welding torch and comprises an electrode 12, means to supply weld filler material 14, a nozzle 16 surrounding the electrode 12, means to supply inert gas 17 to the nozzle 16 and a shroud 18 surrounding the nozzle 16. The electrode 12 and nozzle 16 are coaxial. There are means to form a seal 20 between the nozzle 16 and the shroud 18. The means to form a seal 20 are arranged to allow relative movement between the nozzle 16 and the shroud 18.

The nozzle 16 and the shroud 18 are circular in cross-section in this example and in particular the nozzle 16 and the shroud 18 are cylindrical. The means to form a seal 20 allows relative radial movement between the nozzle 16 and the shroud 18 and the means to form a seal 20 also allows relative axial movement between the nozzle 16 and the shroud 18.

In particular the means to form a seal 20 comprises a plurality of rings 22, 24 and 26. Each ring 22, 24 and 26 has an aperture 28, 30 and 32 respectively and each ring 22, 24 and 26 has an outer diameter 34, 36 and 38 respectively. The diameter of the aperture 28 in a first ring 22 is substantially the same as the diameter of the nozzle 16. The outer diameter 34 of the first ring 22 is less than the outer diameter 36 of a second ring 24. The outer diameter 36 of the second ring 24 is substantially the same as the diameter of the shroud 18. The diameter of the aperture 30 in the second ring 24 is greater than the diameter of the aperture 28 in the first ring 22. The outer diameter 38 of the third ring 26 is less than the outer diameter 36 of the second ring 24 and greater than the outer diameter 34 of the first ring 22. The diameter of the aperture 32 in the third ring 26 is greater than the diameter of the aperture 28 in the first ring 22 and less than the diameter of the aperture 30 in the second ring 24. The rings 22, 24 and 26 are slidably mounted to allow relative radial movement between the nozzle 16 and the shroud 18.

The first ring 22 has an annular sleeve 40 and the annular sleeve 40 locates on the nozzle 16. The diameter of the sleeve 40 is substantially the same as the diameter of the aperture 28 in the first ring 22 and the diameter of the nozzle 16.

The second ring 24 is supported by the first ring 22 and in particular the second ring 24 is supported by the third ring 26 and the third ring 26 is supported by the first ring 22.

The outer diameter of the second ring 24 is movable to allow relative axial movement between the nozzle 16 and the shroud 18.

The first ring 22 has a flange 35 at its outer diameter 34 extending axially towards the third ring 26. The second ring 24 has a flange 37 at the aperture 30 extending axially towards the third ring 26. The third ring 26 has a flange 39 at the aperture 32 extending axially towards the first ring 22 and a flange 41 at its outer diameter 38 extending axially towards the second ring 24. The flanges 35, 37, 39 and 41 limit relative sliding movement of the first, second and third rings 22, 24 and 26.

A sealing member 42 is provided around the shroud 18 to form a seal, in operation, with at least one component, or member upon which the component is built, 44. The sealing member 42 may be weighted to form a seal, in operation, with a curved surface of the at least one component, or member upon which the component is built, 44.

The means to supply weld filler material 14 extends through the first ring 22. The supply of weld filler material may be a supply of metal, or alloy, wire.

The welding torch 10 may be mounted on a multi-axis robot guided by a control system programmed to follow the shape of a component to be built up or to follow the shape of a sub-component to be built up on a component.

In operation the electrode 12 of the welding torch 10 and the at least one component, or member upon which the component is built, 44 are connected to a voltage source (not shown) to produce an arc between the tip of the electrode 12 and the at least one component, or member upon which the component is built, 44. An inert gas is supplied from an inert gas source (not shown) to the nozzle 16 and the inert gas flows into the shroud 18. Weld filler material 14 is supplied into the shroud 18 in proximity to the electrode 12 and arc so as to melt the weld filler material and to deposit the weld filler material 14 onto the at least one component, or member, 44 at the required position.

The shroud 18 is arranged such that an end 46 of the shroud 18 nearest to the component, or member, 44 abuts and seals against the component, or member, 44 or is spaced a small distance there from. The shroud 18 remains substantially stationary on the component, or member, 44 during the welding process. The shroud 18 ensures that the whole of the weld deposit is covered by inert gas and controls the flow of inert gas out of the shroud 18. The shroud 18 may be weighted to ensure that the shroud 18 does not move. The sealing member also may be weighted to ensure a seal is formed and to ensure the shroud 18 does not move.

The electrode 12 and nozzle 16 are moved together as a unit during the welding process relative to the shroud 18. The rings 22, 24 and 26 form the seal 20 between the nozzle 16 and the shroud 18 and the rings 22, 24 and 26 slide radially over each other to allow the nozzle 16 to move radially relative to the shroud 18 and the rings 22, 24 and 26 move axially relative to the shroud 18. The pressure of the inert gas within the shroud 18 makes the rings 26 float on the ring 22 and the ring 24 float on the ring 26 and this minimises friction on the nozzle 16. Thus FIG. 1 illustrates the welding torch 10 with the electrode 12 and nozzle 16 in a first position in which the electrode 12 and nozzle 16 are coaxial with the shroud 18. FIG. 2 illustrates the welding torch 10 with the electrode 12 and nozzle 16 in a second position in which the electrode 12 and nozzle 16 are displaced radially from the axis of the shroud 18.

The welding torch 10 has been used without the sealing member 42 to weld flat titanium alloy, for example a titanium alloy consisting of 6 wt % aluminium, 4 wt % vanadium and the balance titanium plus incidental impurities, components 44 using an argon inert gas. The welds produced were clean and were produced with only the supply of argon inert gas to the nozzle 16.

The sealing member 42 allows the welding torch 10 to work on three dimensionally curved titanium alloy components 44.

The welding torch may be moved to other areas of the component, or member, 44 to be welded after one particular area has been welded.

The present invention replaces a sealed chamber into which the whole of the welding torch, associated equipment and components have to be placed. This reduces costs. The present invention provides a controlled inert gas atmosphere around the area to be welded only.

Although the present invention has referred to the use of sealing members which are rings the means to form a seal may generally comprise a plurality of members, each member having an aperture and a periphery, the dimensions of the aperture in a first member being substantially the same as the dimensions of the nozzle, the dimensions of the periphery of the first member being less than the dimensions of the periphery of a second member, the dimensions of the periphery of the second member being substantially the same as the dimensions of the shroud, the dimensions of the aperture in the second member being greater than the dimensions of the aperture in the first member, the members being slidably mounted to allow relative movement between the nozzle and the shroud.

There may be three members, the dimensions of the periphery of the third member is less than the dimensions of the periphery of the second member and greater than the dimensions of the periphery of the first member, the dimensions of the aperture in the third member is greater than the dimensions of the aperture in the first member and less than the dimensions of the aperture in the second member.

The nozzle and the shroud may be rectangular in cross-section. The nozzle and shroud may be square in cross-section.

The members may be rectangular in shape.

The members may also be any other suitable shape for example, triangular, pentagonal, hexagonal, heptagonal or octagonal in shape.

In the case of the circular members the periphery of the circular members would have a dimension equal to the circumference, for the other shaped members the periphery of the members would have a dimension equal to the sum of the lengths of sides of members.

Although the invention has been described with reference to free shape welding to build up components it is equally applicable to other welding processes.

I claim:

1. A welding torch comprising an electrode, means to supply weld filler material, a nozzle surrounding the electrode, means to supply inert gas to the nozzle and a shroud surrounding the nozzle, means to form a seal between the nozzle and the shroud, the means to form a seal being arranged to allow relative movement between the nozzle and the shroud, wherein the means to form a seal comprises a plurality of members, each member having an aperture and a periphery, the dimensions of the aperture in a first member being substantially the same as the dimensions of the nozzle, the dimensions of the periphery of the first member being less than the dimensions of the periphery of a second member, the dimensions of the periphery of the second member being substantially the same as the dimensions of the shroud, the dimensions of the aperture in the second member being greater than the dimensions of the aperture in the first member, the members being slidably mounted to allow relative movement between the nozzle and the shroud.

2. A welding torch as claimed in claim 1 wherein there are three members, the dimensions of the periphery of the third member is less than the dimensions of the periphery of the second member and greater than the dimensions of the periphery of the first member, the dimensions of the aperture in the third member is greater than the dimensions of the aperture in the first member and less than the dimensions of the aperture in the second member.

3. A welding torch as claimed in claim 1 wherein the nozzle and the shroud are circular in cross-section.

4. A welding torch as claimed in claim 3 wherein the nozzle and shroud are cylindrical.

5. A welding torch as claimed in claim 3 wherein the means to form a seal allows relative radial movement between the nozzle and the shroud.

6. A welding torch as claimed in claim 5 wherein the means to form a seal allows relative axial movement between the nozzle and the shroud.

7. A welding torch as claimed claim 3 wherein the means to form a seal comprises a plurality of rings, each ring having an aperture and an outer diameter, the diameter of the aperture in a first ring being substantially the same as the diameter of the nozzle, the outer diameter of the first ring being less than the outer diameter of a second ring, the outer diameter of the second ring being substantially the same as the diameter of the shroud, the diameter of the aperture in the second ring being greater than the diameter of the aperture in the first ring, the rings being slidably mounted to allow relative radial movement between the nozzle and the shroud.

8. A welding torch as claimed in claim 7 wherein there are three rings, the outer diameter of the third ring is less than the outer diameter of the second ring and greater than the outer diameter of the first ring, the diameter of the aperture in the third ring is greater than the diameter of the aperture in the first ring and less than the diameter of the aperture in the second ring.

9. A welding torch as claimed in claim 8 wherein the second ring is supported by the third ring and the third ring is supported by the first ring.

10. A welding torch as claimed in claim 7 wherein the first ring has an annular sleeve and the annular sleeve locates on the nozzle.

11. A welding torch as claimed in claim 7 wherein the second ring is supported by the first ring.

12. A welding torch as claimed claim 7 wherein the outer diameter of the second ring is movable to allow relative axial movement between the nozzle and the shroud.

13. A welding torch as claimed in claim 1 wherein the nozzle and the shroud are rectangular in cross-section.

14. A welding torch as claimed in claim 13 wherein the nozzle and shroud are square in cross-section.

15. A welding torch as claimed in claim 1 wherein the members are rectangular in shape.

16. A welding torch as claimed in claim 1 wherein the members are triangular, pentagonal, hexagonal, heptagonal or octagonal in shape.

17. A welding torch as claimed in claim 1 wherein a sealing member is provided around the shroud to form a seal, in operation, with at least one workpiece.

18. A welding torch as claimed in claim 17 wherein the sealing member is weighted to form a seal, in operation, with a curved surface of the at least one workpiece.

* * * * *